United States Patent
Lo et al.

(10) Patent No.: US 12,381,807 B2
(45) Date of Patent: Aug. 5, 2025

(54) HOST ROUTING WITH VIRTUAL MACHINE MOBILITY

(71) Applicant: Arista Networks, Inc., Santa Clara, CA (US)

(72) Inventors: Alton Lo, Freemont, CA (US); Ian McCloghrie, Santa Clara, CA (US); Navdeep Bhatia, Santa Clara, CA (US)

(73) Assignee: Arista Networks, Inc., Santa Clara, CA (US)

( * ) Notice: Subject to any disclaimer, the term of this patent is extended or adjusted under 35 U.S.C. 154(b) by 667 days.

(21) Appl. No.: 17/507,289

(22) Filed: Oct. 21, 2021

(65) Prior Publication Data
US 2023/0132016 A1   Apr. 27, 2023

(51) Int. Cl.
| | |
|---|---|
| *H04L 45/02* | (2022.01) |
| *G06F 9/455* | (2018.01) |
| *H04L 61/103* | (2022.01) |
| *H04L 61/59* | (2022.01) |
| *H04L 101/622* | (2022.01) |

(52) U.S. Cl.
CPC .......... *H04L 45/02* (2013.01); *G06F 9/45558* (2013.01); *H04L 45/04* (2013.01); *H04L 61/103* (2013.01); *H04L 61/59* (2022.05); *G06F 2009/45595* (2013.01); *H04L 2101/622* (2022.05)

(58) Field of Classification Search
CPC ......... H04L 45/02; H04L 61/59; H04L 45/04; H04L 61/103; H04L 2101/622; G06F 9/45558; G06F 2009/45595
See application file for complete search history.

(56) References Cited

U.S. PATENT DOCUMENTS

| | | | |
|---|---|---|---|
| 10,454,877 B2 * | 10/2019 | Fernando | H04L 41/40 |
| 2015/0263946 A1 * | 9/2015 | Tubaltsev | H04L 45/74 370/392 |
| 2016/0142306 A1 * | 5/2016 | Shimokuni | H04L 45/74 709/238 |
| 2017/0264587 A1 | 9/2017 | Ju et al. | |
| 2018/0309685 A1 * | 10/2018 | Srinivasan | H04L 61/103 |
| 2021/0200578 A1 | 7/2021 | Gao et al. | |

FOREIGN PATENT DOCUMENTS

WO   2021169514 A1   9/2021

OTHER PUBLICATIONS

EVPN Technical White Paper, H3C Technical White Paper, Jun. 12, 2017, pp. 1-17, H3C, China.
Himanshu Shah et al., ARP Broadcast Reduction for Large Data Centers draft-shah-armd-arp-reduction-02.txt, ARMD Informational Internet Draft of the Internet Engineering Task Force, Apr. 27, 2012, pp. 1-11, Geneva, Switzerland.

* cited by examiner

*Primary Examiner* — Nicholas R Taylor
*Assistant Examiner* — Angela Widhalm De Rodriguez
(74) *Attorney, Agent, or Firm* — Tianyi He

(57) ABSTRACT

A method for supporting virtual machine (VM) mobility between network devices connected to a network includes: selecting a first type of route for interconnecting VMs that are connected to the network devices; and adding a feature of a second type of route to the first type of route to enable the network devices to execute proxy address resolution protocol (ARP) for transmitting network traffic between the VMs without requiring each of the network devices to store a physical address of each of the VMs in respective ones of a network address table.

20 Claims, 14 Drawing Sheets

HOST ROUTING WITH VIRTUAL MACHINE MOBILITY

BACKGROUND

A communication system may enable devices to communicate with one another. The communication system may include devices that relay information from a sending device to a destination device.

BRIEF DESCRIPTION OF DRAWINGS

Certain embodiments of the disclosure will be described with reference to the accompanying drawings. However, the accompanying drawings illustrate only certain aspects or implementations of the disclosure by way of example and are not meant to limit the scope of the claims.

DETAILED DESCRIPTION

Figure 1A:
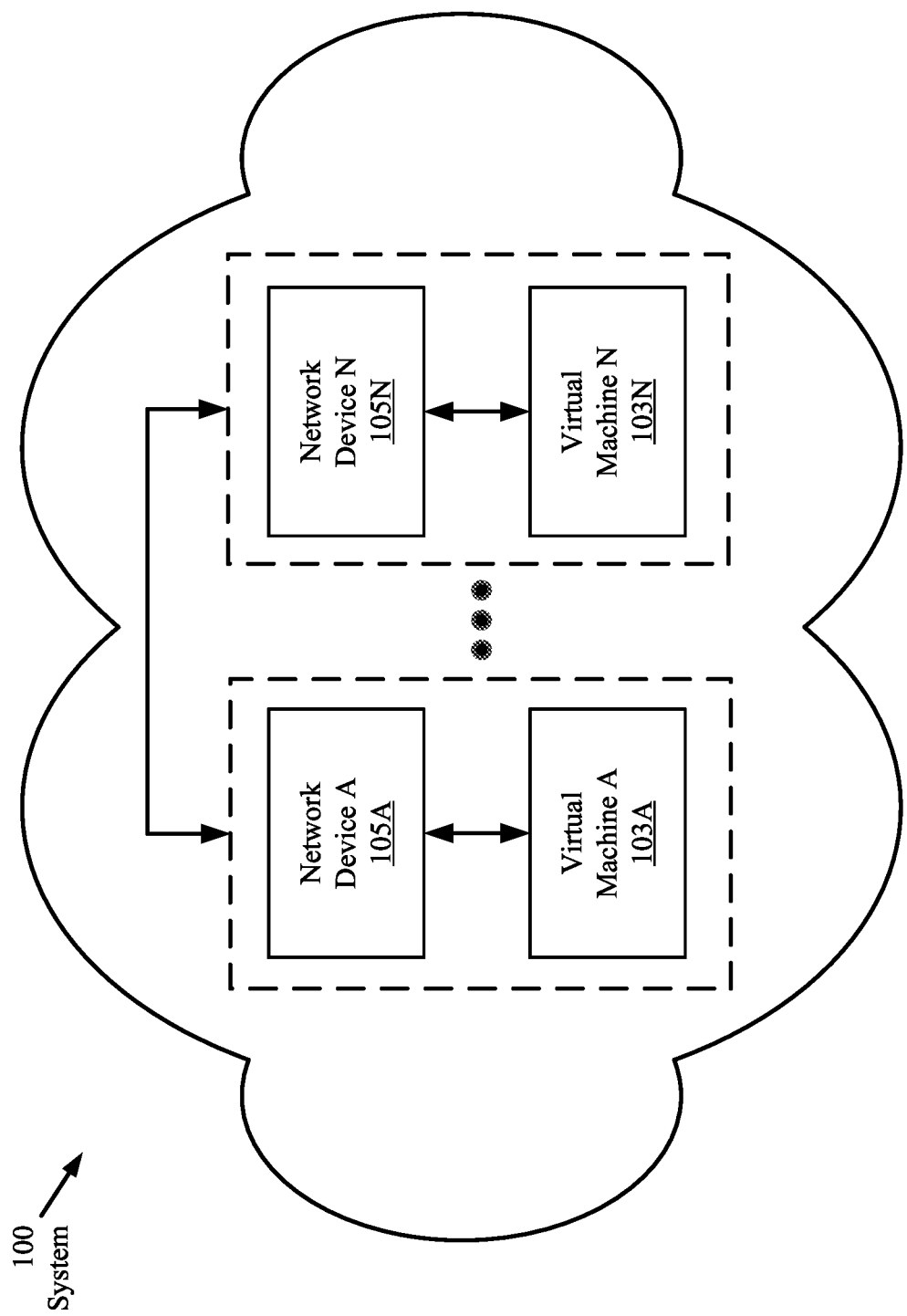
FIG. 1A shows a system in accordance with one or more embodiments described herein.

Specific embodiments will now be described with reference to the accompanying figures.

Virtual machines (VMs) executing on servers may be connected to at least one network device (e.g., a top-of-rack (TOR) switch) configured as a virtual tunnel end point (VTEP). In a conventional Ethernet virtual private network (EVPN) integrated routing and bridging (IRB) networking scheme, all network devices are required to have network address tables (e.g., a layer 2 (L2) forwarding table) that includes: (i) the media access control (MAC) addresses of all other network devices; and (ii) the MAC addresses of all of the VMs. Requiring the network address tables to include the MAC address of all of the VMs presents scalability and VM mobility issues when the network includes thousands to hundreds of thousands of VMs.

One or more embodiments disclosed herein support VM mobility and scalability in the network by removing the requirement to program the MAC addresses of all of the VMs in the network address tables of the network devices. This advantageously reduces the necessary network device resources (e.g., hardware storage resources) required for storing large network address tables comprising hundreds of thousands of entries. This also advantageously allows VMs to be moved between network devices without requiring extensive reprogramming of the network address tables as a result of a VM move.

In particular, one or more embodiments disclosed herein provide a method for supporting VM mobility by combining features of one type of route (may also be referred to as "route type") with features of another type of route, and enabling proxy address resolution protocol (ARP) to be used for transmitting network traffic (i.e., data packets) between VMs. Methods of one or more embodiments for achieving such a combination of route features will be discussed below.

Specifically, in one or more embodiments disclosed herein, features of EVPN type-5 routes are incorporated into type-2 routes. In particular, rather than programming the MAC addresses of each of the VMs into the network address tables of the network devices, proxy ARP is used to help VMs identify other VMs (e.g., to transmit network traffic between VMs). Additionally, similar to how type-5 routes are programmed, a type-2/32 internet protocol (IP) route (or/128 IP route) is programmed between each network device to use the MAC address of a destination network device (i.e., the network device associated with the VMs to which network traffic is intended) as an overlay destination address for the network traffic.

In one or more embodiments, the type-2/32 IP route (or/128 IP route) enables network traffic between VMs to be routed, rather than bridged, by the network devices (as part of a layer-3 forwarding configuration where a layer-3 type network device forwards the network traffic to another network device) using the MAC addresses of the network devices rather than the MAC address of a destination VM. In particular, a VM wishing to send network traffic to another VM would transmit a broadcast ARP request that would be intercepted by the network device associated with the VM. The network device would then respond to the broadest ARP request through the use of proxy ARP.

Additionally, in one or more embodiments disclosed herein, features of type-2 routes are incorporated into type-5 routes, which by default do not require the above MAC address installation required by type-2 routes. In particular, an IP mobility extension using sequence numbers to resolve VM moves, similar to the MAC mobility header used in type-2 routes, are added to the type-5 routes. Additionally, to potentially avoid situations where a network device associated with a VM is misidentified (e.g., a situation where a VM is moved to a different network device before a network traffic transmitted by the VM is processed by any network devices), a unicast reverse path forwarding (uRPF) entry pointing to a tunnel interface (e.g., a vxlan1) to a remote network device associated with a moved VM is created when a /32 IP route is programmed on a local network device for the moved VM.

In one or more embodiments, when a network traffic is received by the local network device from another remote network device, an overlay IP source address of the network traffic is compared to the uRPF. If both entries are associated with the same tunnel interface (e.g., vxlan1), the network traffic is permitted and processed by the local network device. Alternatively, if the network traffic is associated with a local source (e.g., from a VM connected to the local network device), the input interface will be a virtual interface of the network device (e.g., a switch virtual interface (SVI) instead of the tunnel interface (e.g., vxlan1). This situation is a non-limiting example of a VM misidentification. Upon detecting the misidentification, the local network device will trigger a notification that may be used to trigger a VM mobility event.

Various embodiments of the disclosure are described below.

FIG. 1A shows a system (100) in accordance with one or more embodiments of the disclosure. The system (100) includes one or more virtual machines (103A, 103N) that are connected to one or more network devices (105A, 105N) within a network. Each of these components is described below.

In one or more embodiments disclosed herein, each of the one or more virtual machines (103A, 103N) may be a virtual instance of a physical system (e.g., the computing system of FIG. 6) that is executing on a server (not shown). For example, each of the virtual machines (103A, 103N) may be a host executing on the server, and the system (100) may include multiple ones of the server. The server may include at least one or more processor(s), memory, and an operating system. For example, the server may be, but is not limited to, a bare metal server including physical ports that are each connected to one of the network devices (105A, 105N). In one or more embodiments, each of the virtual machines (103A, 103N) is directly (or operatively, e.g., via the network) connected to one of the network devices (105A, 105N).

In one or more embodiments disclosed herein, the one or more network device(s) (105A, 105N) are physical devices (e.g., the computing system of FIG. 6) that include persistent storage, memory (e.g., random access memory), one or more processor(s) (including a switch chip), and two or more physical ports. Examples of the network devices (105A, 105N) include, but are not limited to, a router, a switch, a top of rack (TOR) switch, and a multilayer switch. In one or more embodiments, the network devices (105A, 105N) may be directly (or operatively, e.g., via the network), connected to one another.

The switch chip is hardware that determines which egress port on a network device (105A, 105N) to forward packets (which may be in the form of media access control (MAC) frames). The switch chip may include egress and ingress ports that may connect to ports on the network device (105A, 105N). Each port may or may not be connected to another device (e.g., a server, a switch, a router, etc.). The network device (105A, 105N) may be configured to receive the packets via the ports.

Additionally, the persistent storage in the network device may include any type of non-transitory computer readable medium that stores data. For example, the data in the persistent storage may be instructions, which, when executed by one or more processor(s) in the network device (105A, 105N), enable the network device (105A, 105N) to perform all or a portion of the functions described in accordance with one or more embodiments of the disclosure (see e.g., FIGS. 2A through 5B).

In one or more embodiments disclosed herein, the network may include other network devices (or systems) (not shown) that facilitate communication between the aforementioned components. As such, in one or more embodiments, the network may include any combination of local and/or wide area (e.g., Internet) network segments that may be wire-based and/or wireless and that may use any combination of wired and/or wireless communication protocols. Additionally, a network may refer to an entire network or any portion thereof (e.g., a logical portion of the devices within a topology of devices). A network may include a datacenter network, a wide area network, a local area network, a wireless network, a cellular phone network, or any other suitable network that facilitates the exchange of information from one part of the network to another. In one or more embodiments, the network may be coupled with or overlap, at least in part, with the Internet.

Additional details about the network devices (105A, 105N) are now described below with respect to FIG. 1B.

Figure 1B:
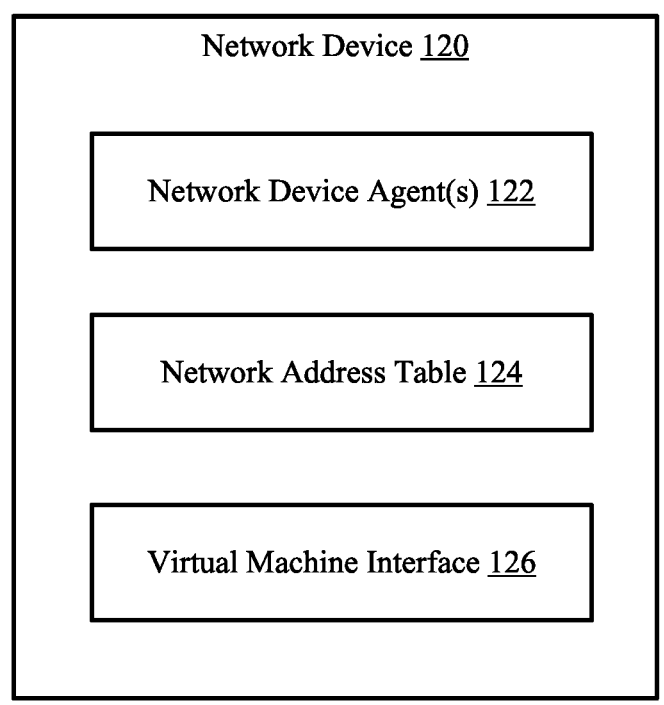
FIG. 1B shows a diagram of a network device in accordance with one or more embodiments disclosed herein.

In particular, turning now to FIG. 1B, FIG. 1B shows a network device (120) in accordance with one or more embodiments of the disclosure. The network device (120) may be the same as any one of the network devices (105A, 105N) described above in FIG. 1A. In addition to the components discussed above in reference to FIG. 1A, the network device (120) further includes: one or more network device agents (122), a network address table (124), and a virtual machine interface (126). Each of the components illustrated in FIG. 1B is described below.

In one or more embodiments disclosed herein, the network device agent(s) (122) interacts with the other components of the network device (120). Each network device agent (122) facilitates the implementation of one or more protocols, services, and/or features of the network device (120). Examples of network device agents (120), include, but are not limited to, a bug-alerts agent, a policy agent that manages access control lists, a user interface agent, a routing information base agent, a forwarding information base agent, and a simple network management protocol (SNMP) agent. In one or more embodiments, the one or more embodiments of the network device agents (122) interact with the other components of the network device (120) to perform all or a portion of the functions described in accordance with one or more embodiments of the disclosure (see e.g., FIGS. 2A through 5B).

In one or more embodiments disclosed herein, the network address table (124) may include information regarding physical addresses (e.g., MAC addresses) of each of the virtual machines (e.g., 103A-103N, FIG. 1A) and each of the network devices (e.g., 105A-105N, FIG. 1A). For example, the network address table may be, but is not limited to, a layer-2 (L2) address forwarding table, a MAC address table, etc. In one or more embodiments, the network address table may be stored in the form of a data structure (e.g., a list, table, etc.) in persistent storage (not shown) of the network device (120). In the context of one or more embodiments disclosed herein, one of ordinary skill in the art would appreciate that the physical address of a network device and/or a virtual machine refers specifically to a MAC address of the respective component.

In one or more embodiments disclosed herein, the virtual machine interface (126) may be a virtual instance of a physical interface (e.g., a physical port) that connects the network device (120) to at least one of the one or more virtual machines. For example, the virtual machine interface (126) may be, but is not limited to, a layer-3 (L3) type switch virtual interface (SVI).

One skilled in the art will recognize that the architecture of the system (100) and of the network device (120) is not limited to the components shown in FIGS. 1A and 1B. For example, system (100) may include other devices connected to the network. Further, the network controller (120) may include components (e.g., a processor, persistent storage, etc.) not shown in FIG. 1B.

Figure 2A:
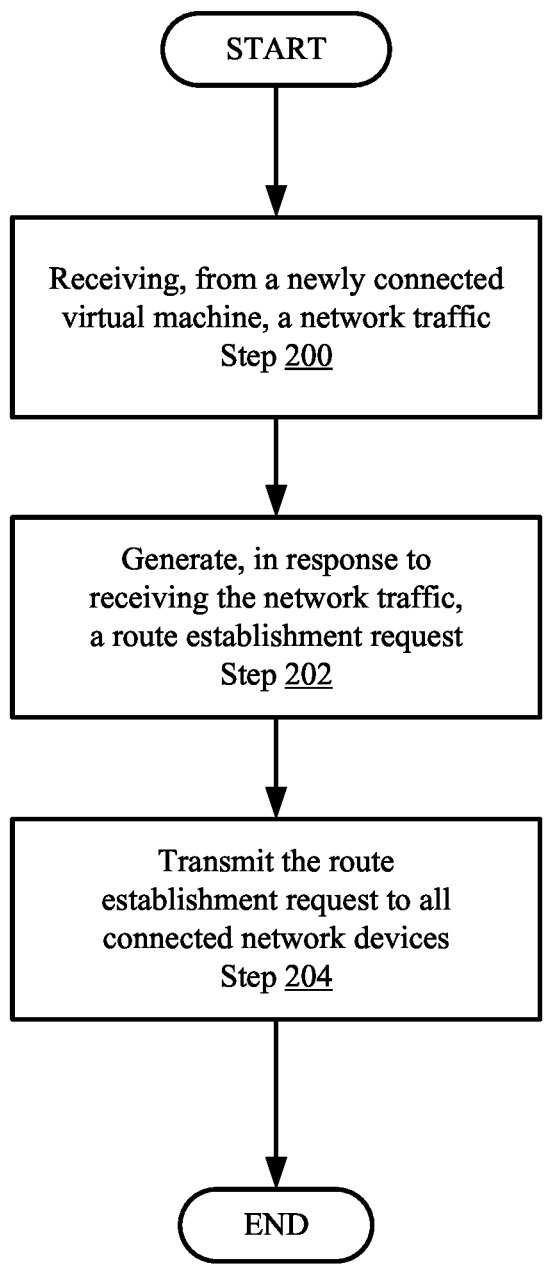
FIGS. 2A-2D show flowcharts in accordance with one or more embodiments described herein.

FIG. 2A shows a flowchart of a method in accordance with one or more embodiments of the disclosure. The method depicted in FIG. 2A may be performed to configure a virtual machine learn event (also referred to herein as simply a "learn event") for network devices connected on a network. The method shown in FIG. 2A may be performed by, for example, a network device (e.g., 120, FIG. 1B). Other components of the systems in FIGS. 1A-1B may perform all, or a portion, of the method of FIG. 2A without departing from the scope of this disclosure.

While FIG. 2A is illustrated as a series of steps, any of the steps may be omitted, performed in a different order, additional steps may be included, and/or any or all of the steps may be performed in a parallel and/or partially overlapping manner without departing from the disclosure.

Initially, in Step 200, the network device receives network traffic (e.g., data packets) from a virtual machine that is newly connected to the network device. In one or more embodiments, the network traffic is sent by the virtual machine to trigger a virtual machine learn event on the network device. Such a learn event allows all other network devices (e.g., 105A-105N, FIG. 1.A) connected to the network device on the network to become aware that a new virtual machine is now connected to the network device.

In one or more embodiments, the virtual machine may be an existing virtual machine that was previously connected to a different network device on the network. For example, assume a system where virtual machine A is connected to a network device A. A virtual machine move is performed and virtual machine A is now connected to network device B. The above-referenced learn event allows network device A to become aware that virtual machine A is now connected to network device B. Alternatively, the virtual machine may be a newly provisioned virtual machine.

In Step 202, in response to receiving the network traffic from the newly connected virtual machine, the network device generates a route establishment request. In one or more embodiments, the route establishment request may include instructions for causing another network device to establish a connection (e.g., in the form of a type-2 route) with the network device.

Additionally, the route establishment request includes an internet protocol (IP) address and a MAC address (i.e., the physical address) of the newly connected virtual machine and a MAC address of the network device. In one or more embodiments, the IP address may be an internet protocol version 4 (IPv4) or an internet protocol version 6 (IPv6 IP) address.

In Step 204, the network device transmits the route establishment request to all (or a portion thereof) of the other connected network devices on the network. This allows the other connected network devices to become aware that a new virtual machine is now connected to the network device. In one or more embodiments, the route establishment request may be transmitted by the network device to all the other connected network devices using border gateway protocol (BGP) techniques.

Figure 2B:
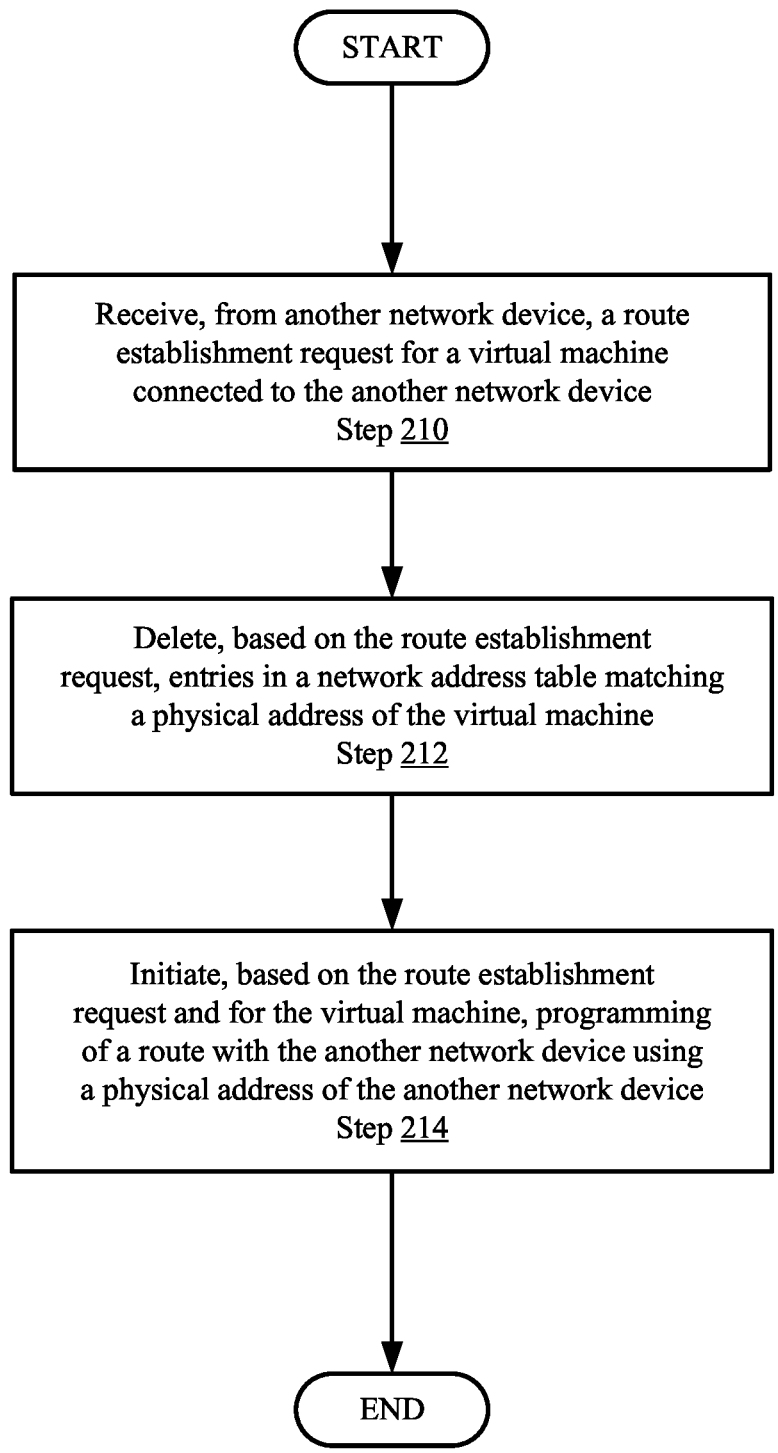

FIG. 2B shows a flowchart of a method in accordance with one or more embodiments of the disclosure. The method depicted in FIG. 2B may be performed to configure a network device to establish communication channels (e.g., routes) with a virtual machine that is newly connected to another network device. The method shown in FIG. 2B may be performed by, for example, a network device (e.g., 120, FIG. 1.B). Other components of the systems in FIGS. 1A-1B may perform all, or a portion, of the method of FIG. 2B without departing from the scope of this disclosure.

While FIG. 2B is illustrated as a series of steps, any of the steps may be omitted, performed in a different order, additional steps may be included, and/or any or all of the steps may be performed in a parallel and/or partially overlapping manner without departing from the disclosure.

In Step 210, a network device receives a route establishment request (e.g., the route establishment request transmitted in Step 204 of FIG. 2A) from another network device. In one or more embodiments, the route establishment request may be processed to configure a communication channel (e.g., a route) from the network device to a virtual machine that is connected to the another network device.

In Step 212, using the route establishment request received in Step 210, the network device deletes entries in a network address table matching a physical address of the virtual machine. In one or more embodiments, in the event the virtual machine is a previously existing virtual machine (see above description in Step 200), the network address table of the network device would include an entry (e.g., a remote address entry) having the MAC address of the virtual machine. Upon receiving the route establishment request, instead of updating this existing entry and/or creating a new entry in the network address table using the MAC address of the virtual machine, the network device removes (i.e., deletes) all MAC address in the network address table matching the MAC address of the virtual machine included in the route establishment request.

Alternatively, in one or more embodiments, in the event the virtual machine is a newly provisioned virtual machine (i.e., no existing entries in the network address table includes the MAC address of the newly provisioned virtual machine), no action will be taken by the network device to add the MAC address of the newly provisioned virtual machine into the network address table. In this example, the network device may still parse the network address table to remove (i.e., delete) any entries that conflict (i.e., match) with the MAC address of the newly provisioned virtual machine.

In Step 214, the network device initiates programming of a route (e.g., a type-2 route including a MAC address and an IP address of the virtual machine and a MAC address of a network device that transmitted the route establishment request) with the another network device using the MAC address of the another network device. In one or more embodiments, this route is programmed in response to receiving the route establishment request from the another network device, and allows the network device to transmit network traffic to the virtual machine connected to the another network device.

In one or more embodiments, in the event that the route establishment request includes an IPv4 IP address of the virtual machine, the programmed route is a /32IP route. Alternatively, in the event that the route establishment request includes an IPv6 IP address of the virtual machine, the programmed route is a /128IP route.

Figure 2C:
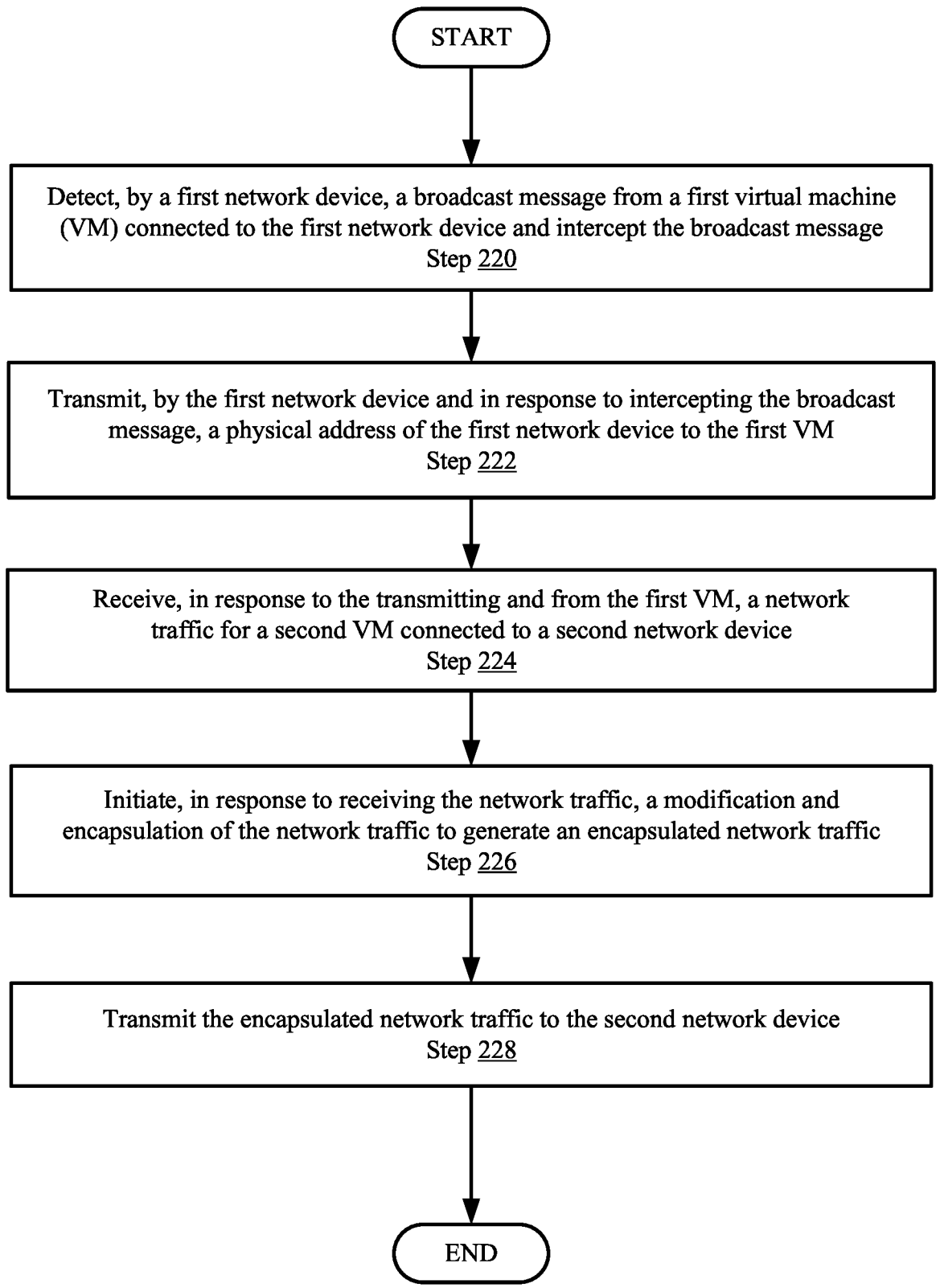

FIG. 2C shows a flowchart of a method in accordance with one or more embodiments of the disclosure. The method depicted in FIG. 2C may be performed to process transmission of network traffic from one virtual machine to another virtual machine. The method shown in FIG. 2C may be performed by, for example, a network device (e.g., 120, FIG. 1.B). Other components of the systems in FIGS. 1A-1B may perform all, or a portion, of the method of FIG. 2C without departing from the scope of this disclosure.

While FIG. 2C is illustrated as a series of steps, any of the steps may be omitted, performed in a different order, additional steps may be included, and/or any or all of the steps may be performed in a parallel and/or partially overlapping manner without departing from the disclosure.

In Step 220, a first network device among network devices connected on a network detects a broadcast message from a first virtual machine connected to the first network device. In response to detecting the broadcast message, the first network device intercepts the broadcast message. In one or more embodiments, the broadcast message may be an address resolution protocol (ARP) broadcast request that includes a request to transmit a network traffic to a second virtual machine that is connected to a second network device among the network devices.

In Step 222, in response to intercepting the broadcast message, the first network device transmits a physical address (i.e., the MAC address) of the first network device to the first virtual machine. In one or more embodiments, the network device may transmit its own physical address to the first virtual machine as a proxy ARP response in response to the first virtual machine's ARP broadcast request.

In Step 224, in response to transmitting the proxy ARP response to the first virtual machine, the first network device receives (from the first virtual machine) a network traffic to be transmitted to the second virtual machine connected to the second network device. In one or more embodiments, the network traffic may include, for example as part of a header of the network traffic, an IP address of the second virtual machine as an IP destination address for the network traffic and the MAC address of the first network device as a MAC destination address.

In Step 226, in response to receiving the network traffic from the first virtual machine, the first network device initiates a modification and encapsulation of the network traffic to generate an encapsulated network traffic. In one or more embodiments, the network traffic (namely, the header of the network traffic) is modified to rewrite the MAC address of the second network device as the MAC destination address (i.e., the MAC address of the first network device originally included in the network traffic is replaced with the MAC address of the second network device).

Additionally, in one or more embodiments, the first network device executes a routing lookup to obtain the MAC address of the second network device. In response to finding the MAC address of the second network device, the network traffic is encapsulated by adding a virtual extensible local area network (VXLAN) tunnel header to the network traffic. In this configuration of one or more embodiments, instead of bridging the network traffic to the second virtual machine using the MAC address of the second virtual machine that is conventionally programmed into a network address table of the first network device, the first network device instead routes the network traffic to the second virtual machine. This advantageously prevents the first network device (and any of the other network devices) from having to program MAC addresses of all virtual machines in the network address table. More specifically, tens of thousands of virtual machines may be connected on the network, resulting in large network address tables that take up a large amount of storage resources in the persistent storage of a network device.

In one or more embodiments, in the event that the first network device is unable to obtain the MAC address of the second network device (i.e., a learn event for the second virtual machine has not been initiated and/or completed), the first network device discards the network traffic and generates an ARP request for the second virtual machine. In one or more embodiments, the ARP request is flooded in the underlay and when the second virtual machine replies to the ARP request through the second network device, a learn event is triggered on the second network device (e.g., the learn event discussed above in the flowchart of FIG. 2A). This learn event results in the programming of the route using the MAC address of the second network device on the first network device, which now enables network traffic to be routed from the first network device to the second virtual machine. In one or more embodiments, after the first network device discards the network traffic, the first virtual machine may retransmit the network traffic to the first network device in response to a request from the first network device.

In Step 228, the first network device transmits the encapsulated network traffic to the second network device. In one or more embodiments, the encapsulated network traffic may be transmitted through the underlay network.

Figure 2D:
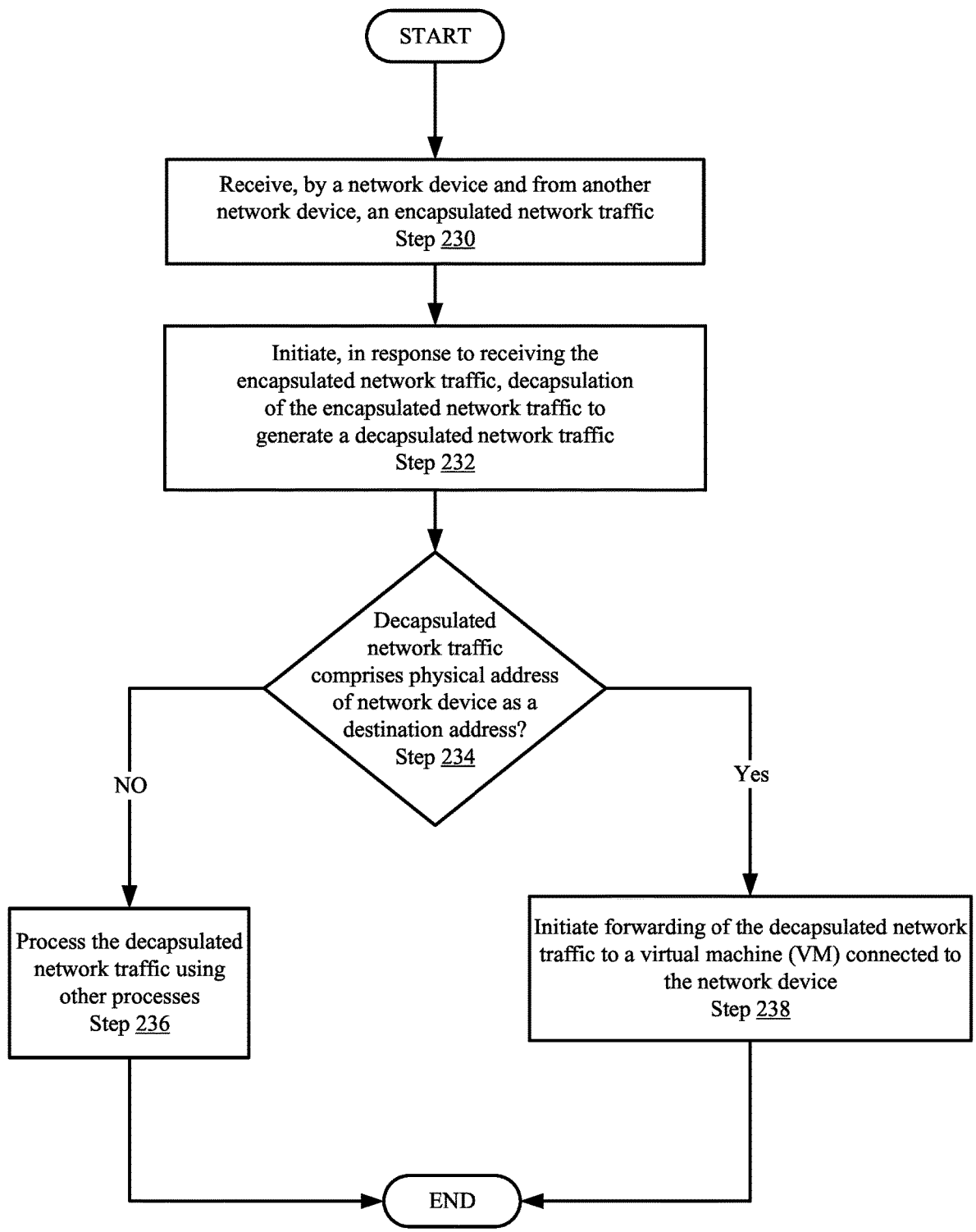

FIG. 2D shows a flowchart of a method in accordance with one or more embodiments of the disclosure. The method depicted in FIG. 2D may be performed to process an encapsulated network traffic. The method shown in FIG. 2D may be performed by, for example, a network device (e.g., 120, FIG. 1.B). Other components of the systems in FIGS. 1A-1B may perform all, or a portion, of the method of FIG. 2D without departing from the scope of this disclosure.

While FIG. 2D is illustrated as a series of steps, any of the steps may be omitted, performed in a different order, additional steps may be included, and/or any or all of the steps may be performed in a parallel and/or partially overlapping manner without departing from the disclosure.

In Step 230, a network device receives an encapsulated network traffic (e.g., the encapsulated traffic transmitted in Step 228 of FIG. 2C) from another network device. In response to receiving the encapsulated network traffic, the network device (in Step 232) initiates decapsulation of the encapsulated traffic to generate a decapsulated network traffic. In one or more embodiments, the network device may decapsulate the encapsulated network traffic by stripping (i.e., removing) a VXLAN tunnel header (e.g., the VXLAN tunnel header appended in Step 226 of FIG. 2C) of the encapsulated network traffic.

In Step 234, the network device determines whether the decapsulated network traffic comprises its own MAC address as a MAC destination address. In response to determining that the decapsulated network traffic includes the network device's MAC address as the MAC destination address (i.e., YES in Step 234), the network device initiates (in Step 238) forwarding of the decapsulated network traffic to a virtual machine connected to the network device (e.g., using a local link using the MAC address of the virtual machine as a destination address for the decapsulated network traffic). For example, (in Step 238), the network device may rewrite the existing destination MAC address in the decapsulated network traffic to that of the virtual machine connected to the network device.

Alternatively, in one or more embodiments, in response to determining that the decapsulated network traffic does not include the network device's MAC address as the MAC destination address (i.e., NO in Step 234), the network device processes (in Step 236) the decapsulated network traffic using other processes. For example, in one or more embodiments, the network device may discard (e.g., drop) the decapsulated network traffic. As another example, the network device may perform a routing lookup using the MAC destination address included in the decapsulated network traffic and re-encapsulate and route the network traffic to another network device having a MAC destination address that matches the MAC destination address included in the decapsulated network traffic.

Figure 3A:
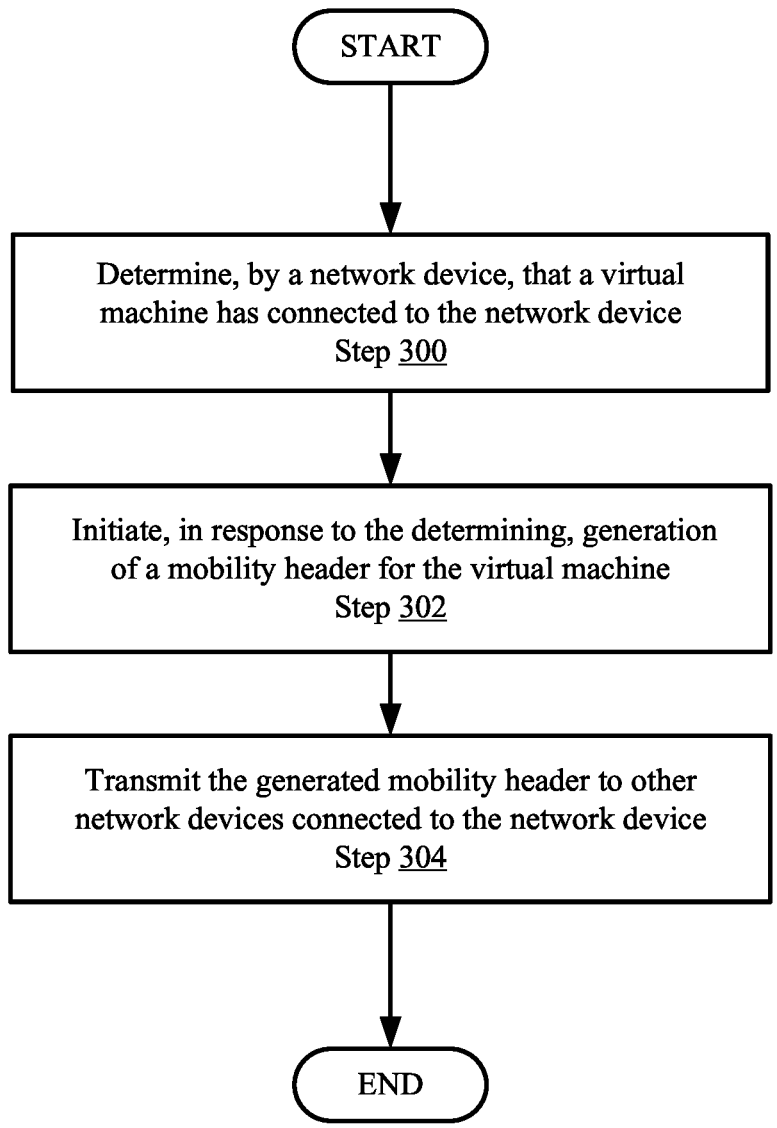
FIGS. 3A and 3B show flowcharts in accordance with one or more embodiments described herein.

FIG. 3A shows a flowchart of a method in accordance with one or more embodiments of the disclosure. The method depicted in FIG. 3A may be performed to configure a virtual machine learn event for systems (e.g., 100, FIG. 1A) employing type-5 EVPN route advertisement mechanisms. The method shown in FIG. 3A may be performed by, for example, a network device (e.g., 120, FIG. 1.B). Other components of the systems in FIGS. 1A-1B may perform all, or a portion, of the method of FIG. 3A without departing from the scope of this disclosure.

While FIG. 3A is illustrated as a series of steps, any of the steps may be omitted, performed in a different order, additional steps may be included, and/or any or all of the steps may be performed in a parallel and/or partially overlapping manner without departing from the disclosure.

In Step 300, a network device among inter-connected network devices on a network determines that a virtual machine has connected to the network device. In one or more embodiments, the network device may determine that a virtual machine has connected to the network device through receiving network traffic from the virtual machine. For example, similar to Step 200 in FIG. 2A, the network traffic from the virtual machine may trigger a learn event on the network device.

In Step 302, in response to determining that a virtual machine has connected to the network device, the network device initiates generation of a mobility header for the virtual machine. In one or more embodiments, the mobility header may be similar to MAC mobility headers used in type-2 EVPN route communication mechanisms. For example, the mobility headers may be an IP mobility header including sequence numbers used for resolving virtual machine moves in the network. In one or more embodiments, the sequence numbers may have, but are not limited to, a format including a 32-bit unsigned integer starting with a value of 1, incrementing monotonically as the network device moves around the network.

In Step 304, the generated mobility header is transmitted, by the network device, to all other network devices connected on the network. In one or more embodiments, the mobility header may be transmitted as a new EVPN IP mobility extended community associated with border gateway protocol (BGP) routes.

Figure 3B:
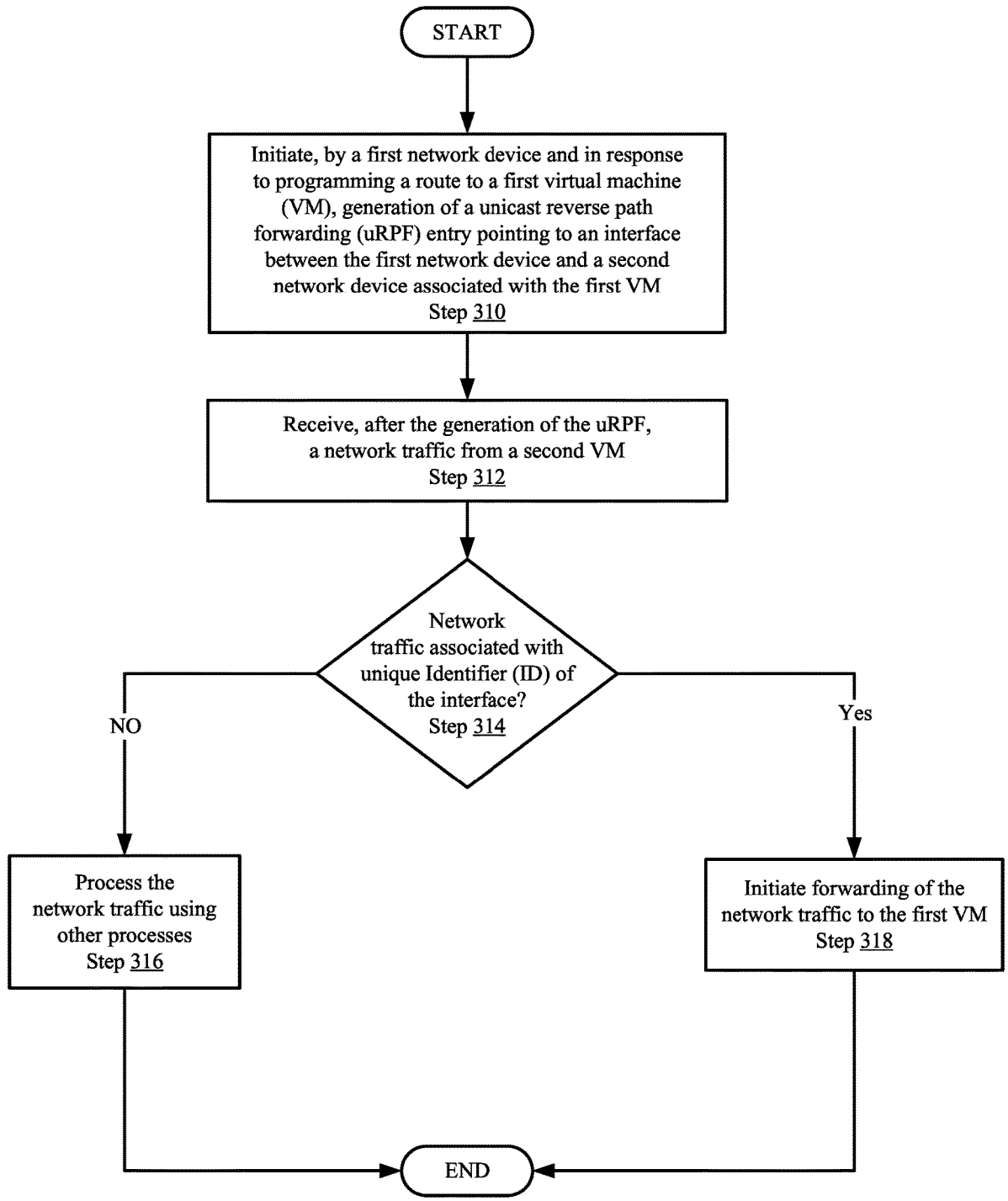

FIG. 3B shows a flowchart of a method in accordance with one or more embodiments of the disclosure. The method depicted in FIG. 3B may be performed to configure a process for avoiding one or more situations where a network device associated with a virtual machine is misidentified as a result of a learn event not yet being executed after a virtual machine move event. The method shown in FIG. 3B may be performed by, for example, a network device (e.g., 120, FIG. 1.B). Other components of the systems in FIGS. 1A-1B may perform all, or a portion, of the method of FIG. 3B without departing from the scope of this disclosure.

While FIG. 3B is illustrated as a series of steps, any of the steps may be omitted, performed in a different order, additional steps may be included, and/or any or all of the steps may be performed in a parallel and/or partially overlapping manner without departing from the disclosure.

In Step 310, a first network device initiates generation of a unicast reverse path forwarding (uRPF) entry pointing to an interface (e.g., a tunnel interface) between the first network device and a second network device. In one or more embodiments, the interface may be associated with a first virtual machine connected to the first network device such that a route from the second network device to the first virtual machine may be programmed. Additionally, the generation of the uRPF entry may be in response to a start of a programming of the route to the first virtual machine from the second network device.

In Step 312, after generation of the uRPF, the first network device receives network traffic from a second virtual machine on the network; the network traffic is to be transmitted to the first virtual machine. The first network device receives the network traffic from the second virtual machine and (in Step 314) determines whether the network traffic is associated with a unique identifier (ID) of the interface associated with the first virtual machine. In one or more embodiments, the first network device may look up the unique ID in a uRPF address table stored in the first network device using a source address included in a header of the network traffic.

Additionally, in one or more embodiments, the second virtual machine may initially be connected to the second network device but subsequently moved (e.g., via a virtual machine move) to instead be connected to the first network device prior to transmitting the network traffic for the first virtual machine.

In one or more embodiments, if it is determined that the network traffic includes the unique ID of the interface (i.e., YES in Step 314), the first network device initiates forwarding of the network traffic to the first virtual machine (e.g., using a local link with the first virtual machine).

Alternatively, if it is determined that the network traffic does not include the unique ID of the interface (i.e., NO in Step 316), the first network device processes the network traffic using other processes. For example, if it is determined that the network traffic is associated with a local source (e.g., from a virtual machine connected to the first network device in a situation where the second virtual machine moved from the second network device to the first network device prior to the transmission of the network traffic and before the first network device could learn about this virtual machine move), the network traffic may be discarded (i.e., dropped). Alternatively, the network traffic may not be deleted and used for learn processing (by a processor of the network device and/or a user/administrator of the network device) to prevent similar situations from occurring in the future.

In one or more embodiments, the input interface where the network traffic is received from the second virtual machine may be a virtual machine interface (e.g., 126, FIG. 1B) of the first network device (e.g., a switch virtual interface (SVI) instead of the tunnel interface. This situation presents a non-limiting example of a virtual machine misidentification after a virtual machine move has occurred and before a learn event is executed in response to the move. Upon detecting the virtual machine misidentification, the first network device may trigger a notification that triggers a virtual machine mobility event such that the first network device can initiate a learn event for the second virtual machine.

Figure 4A:
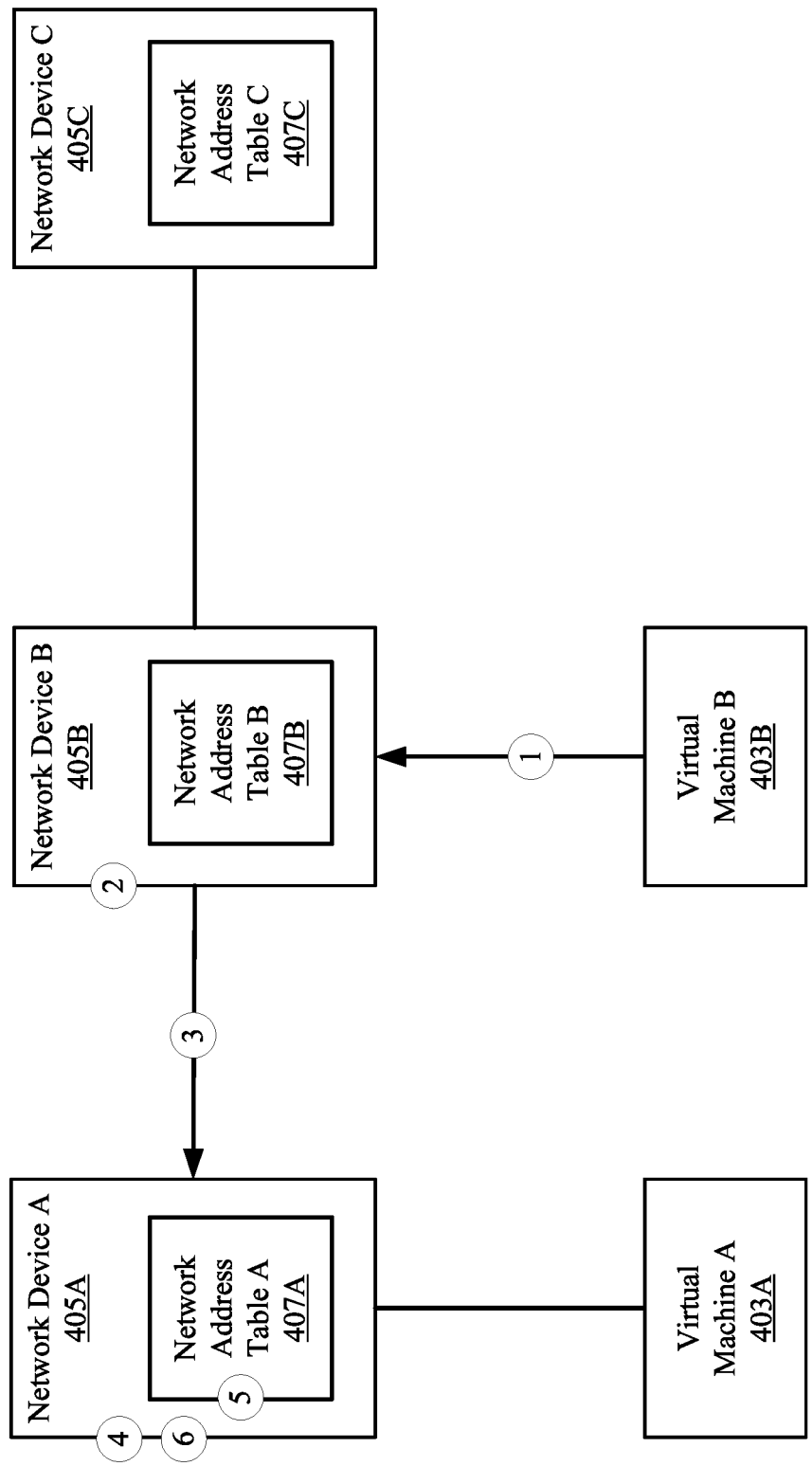
FIGS. 4A-4C show an example in accordance with one or more embodiments described herein.
Figure 4B:
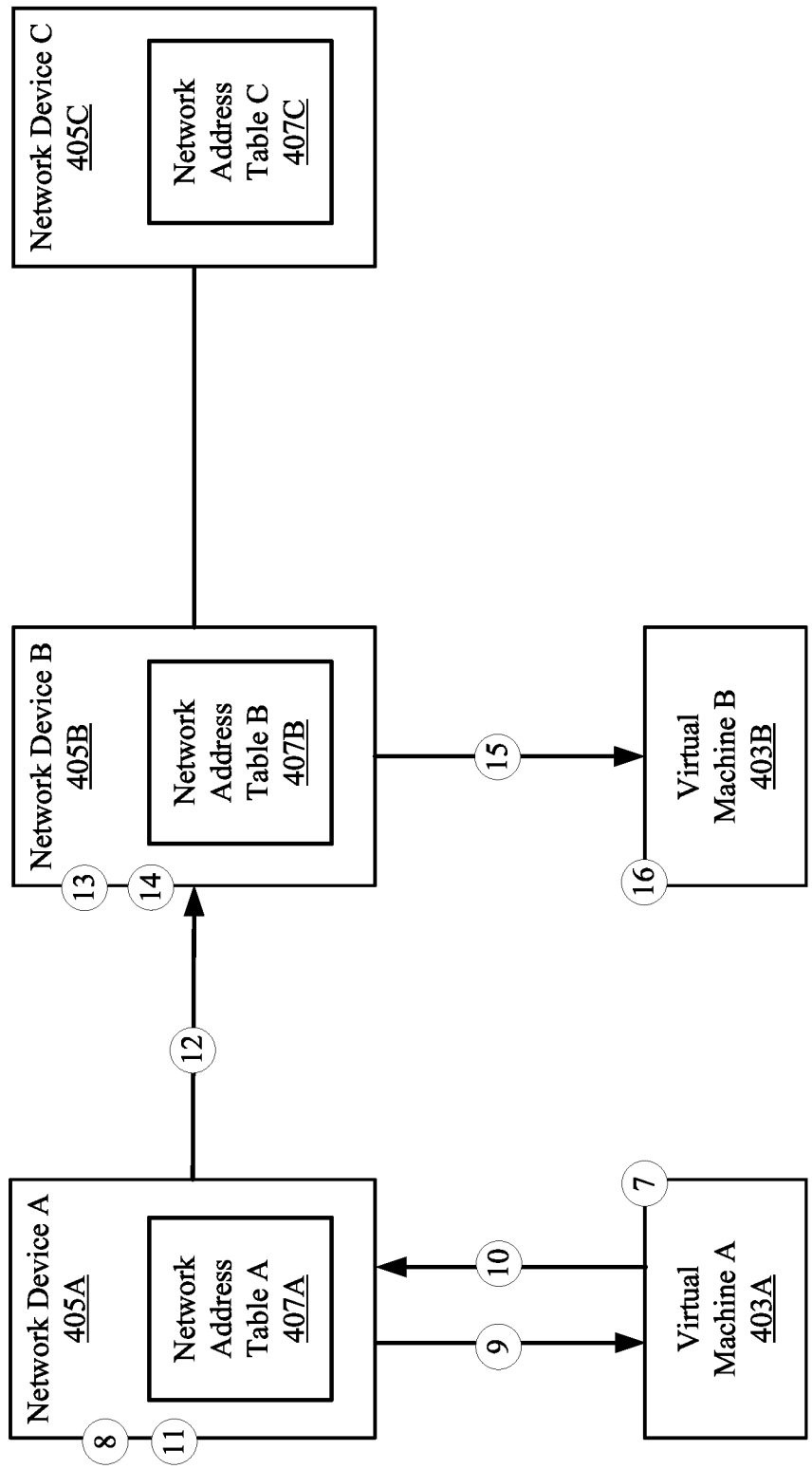
Figure 4C:
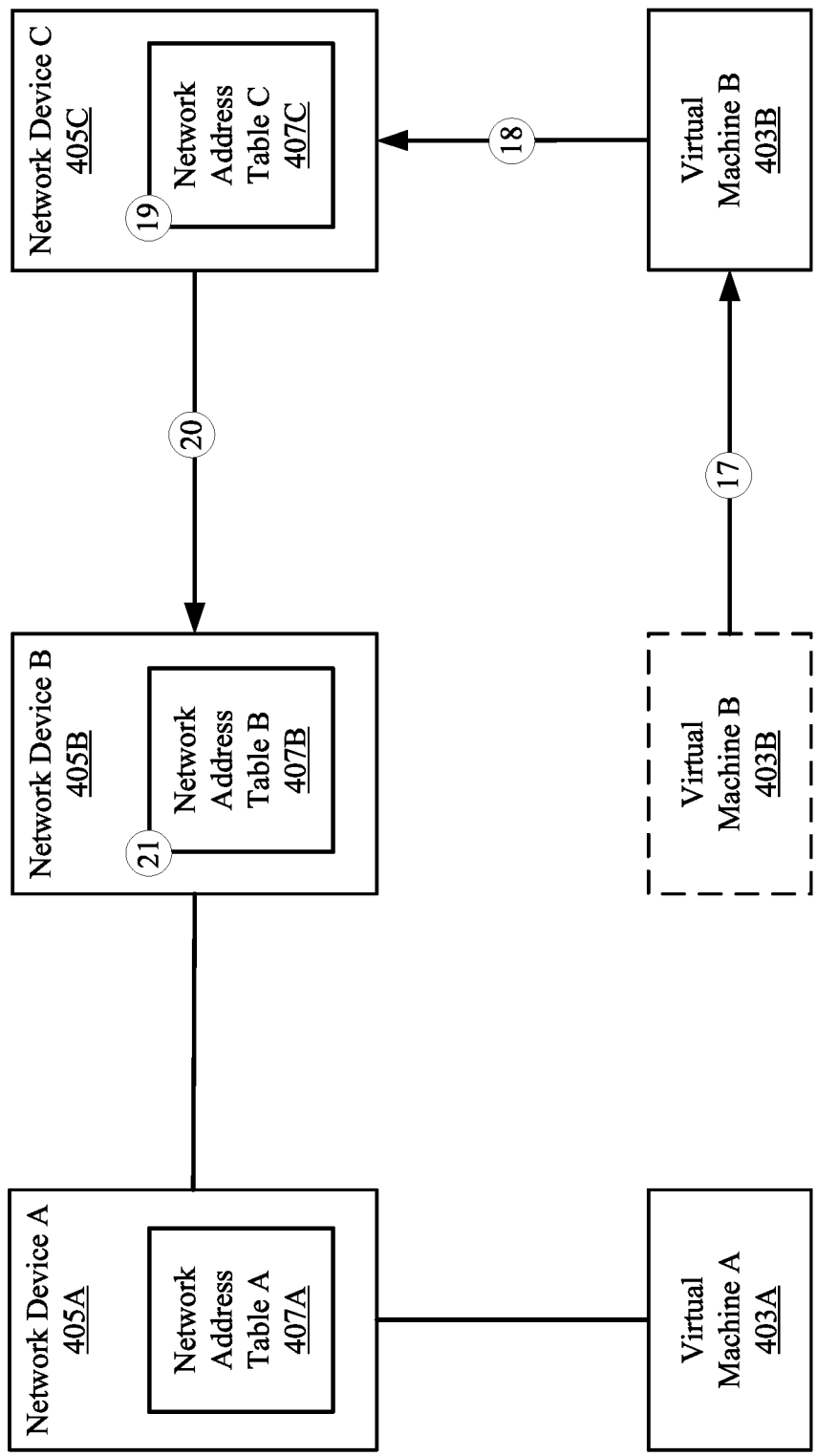

To further clarify embodiments of the disclosure, a non-limiting working example is provided in FIGS. 4A-4C. Specifically, FIGS. 4A-4C show a non-limiting working example of the method discussed above in reference to FIGS. 2A-2D.

Start of Example

In FIG. 4A, a virtual machine B (VM B) (403B) transmits a packet triggering a learn event to network device B (405B) [1]. Network device B (405B), in response to receiving the packet, generates a packet including a type-2 route with an IP and MAC address of VM B (403B) and stores VM B's MAC address in its network address table B (407B) [2]. The generated packet is transmitted to network device A (405A) [3]. Network device A (405A) receives the packet with the type-2 route from network device B (405B) [4]. Subsequently, network device A (405A) deletes all entries in its network address table A (407A) matching the MAC address of VM B (403B) [5]. Network device A (405A) also programs a /32 IP route using a MAC address of network device B (405B) [6].

Turning to FIG. 4B, at some point in time after the /32 IP route is programmed in network device A (405A), virtual machine A (VM A) (403A) transmits an address resolution protocol (ARP) request including the IP address of VM B to a broadcast MAC address [7]. Network device A (405A) detects the ARP request and intercepts the ARP request [8]. After intercepting the ARP request, network device A (405A) replies to VM A with its own MAC address [9]. VM A, in response to receiving the response from network device A (405A) transmits a network traffic (e.g., data packet) including VM B's IP address as an IP destination address and network device A's (405A) MAC address as a MAC destination address to network device A (405A) [10].

Additionally, network device A (405A) receives the network traffic and modifies the MAC destination address to the MAC address of network device B (405B) and encapsulates the network traffic by adding a VXLAN tunnel header [11]. The encapsulated network traffic is transmitted to network device B (405B) [12]. Network device B (450B) receives the encapsulated traffic and decapsulates the encapsulated network traffic [13]. Network device B (405B) determines that the MAC destination address in the decapsulated network traffic matches its own MAC address and looks up VM B's IP address in its network address table [14]. As a result of the matching, network device B (405B) forwards the decapsulated network traffic to VM B (403B) [15]. VM B receives the decapsulated network traffic and processes the decapsulated network traffic [16].

Turning now to FIG. 4C, at any point in time after the events of FIG. 4B, VM B (403B) is moved to be connected with network device C (405C) [17]. Upon connecting to network device C (405C), VM B (403B) transmits a packet triggering a learn event to network device C (405C) [18]. Network device C adds VM B's MAC address to its network address table C (407C) [19], and transmits the route establishment request (e.g., the route establishment request discussed above in FIG. 4A) to network device B (405B) [20]. Network device B (405B) receives the route establishment request, deletes VM B's MAC address from its network address table B (407B), and programs the /32 IP route [21].

End of Example

Figure 5A:
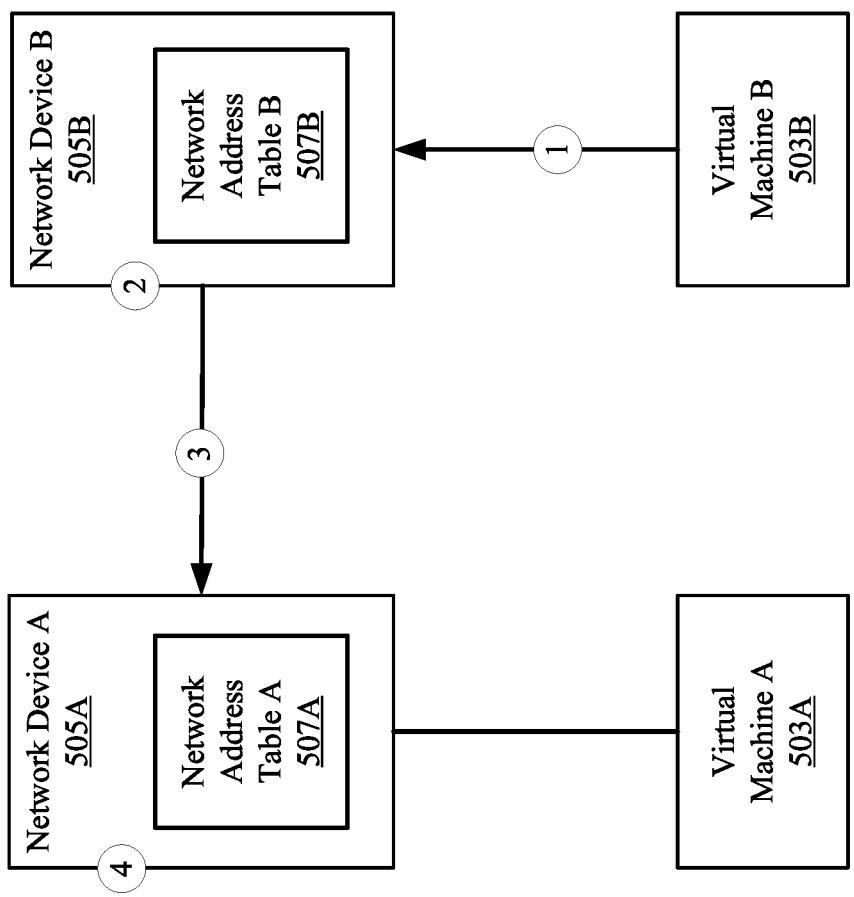
FIGS. 5A and 5B show another example in accordance with one or more embodiments described herein.
Figure 5B:
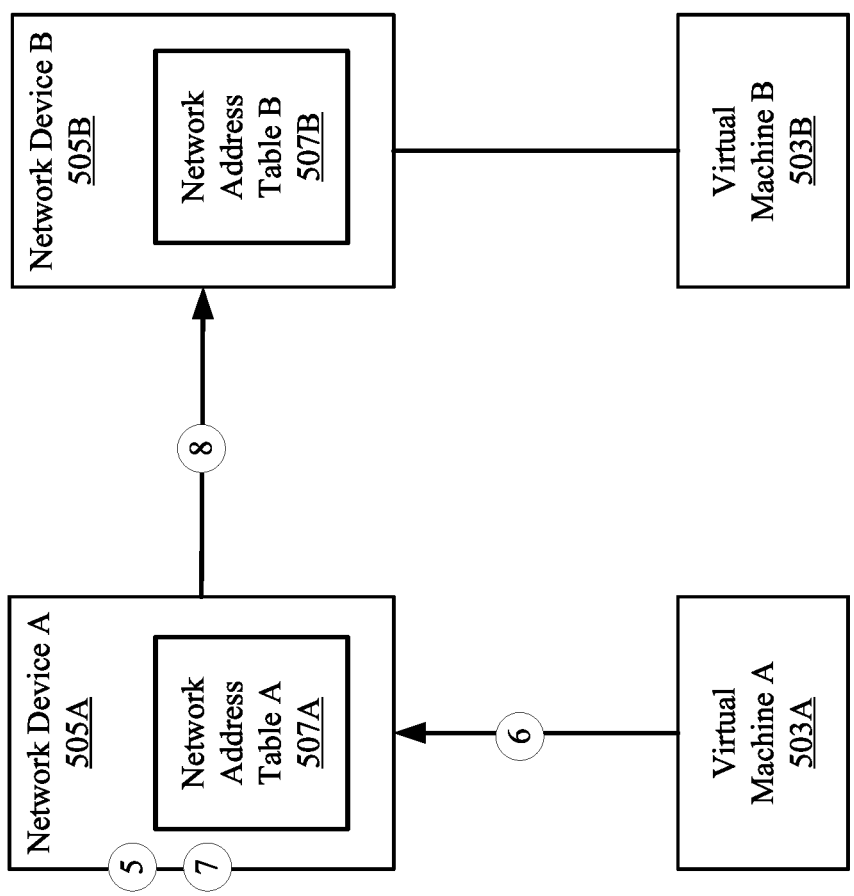

To further clarify embodiments of the disclosure, another non-limiting working example is provided in FIGS. 5A and 5B. Specifically, FIGS. 5A and 5B show a non-limiting working example of the method discussed above in reference to FIGS. 3A and 3B.

Start of Example

In FIG. 5A, virtual machine B (VM B) (503B) transmits a packet triggering a learn event to network device B (505B) [1]. Network device B (505B) generates a routing update including a type-5 route with an IP mobility header [2]. The routing update including the type-5 route and the IP mobility header are transmitted to network device A (505A) to notify network device A of the new VM B (503B) connection with network device B (505B) [3]. Network device A (505A) receives the packet, programs the type-5 route, and stores the IP mobility header [4].

Turning now to FIG. 5B, at some point in time after network device A (505A) programs the type-5 route, network device A (505A) generates a unicast reverse path forwarding (RPF) entry pointing to an interface (e.g., a tunnel interface) between itself and network device B (505B) [5]. Subsequently, VM A (503A) transmits to network device A (505A) a network traffic (i.e., data packet) to be transmitted to VM B (503B) [6]. Network device A (505A) receives the network traffic and determines whether the network traffic includes information identifying the interface between network device A (505A) to network device B (505B) [7]. Network device A (507A) determines there is information in the network traffic identifying the interface and forwards the network traffic to network device B (505B) to be subsequently forwarded to VM B (503B) [8].

End of Example

Figure 6:
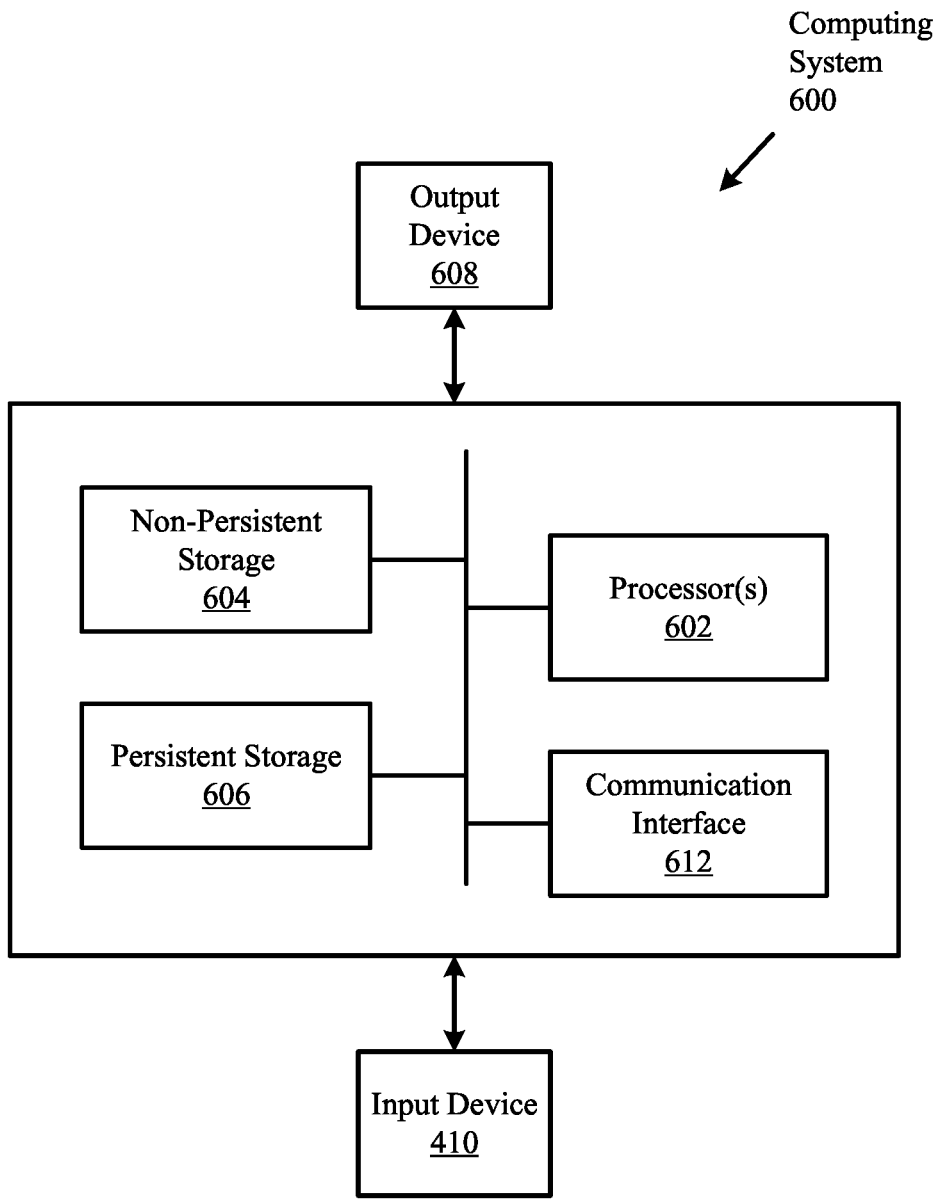
FIG. 6 shows a diagram of a computing device in accordance with one or more embodiments described herein.

As discussed above, embodiments disclosed herein may be implemented using computing devices. FIG. 6 shows a diagram of a computing device in accordance with one or more embodiments disclosed herein. Computing device (600) may include one or more computer processors (602), non-persistent storage (604) (e.g., volatile memory, such as random access memory (RAM), cache memory), persistent storage (606) (e.g., a hard disk, an optical drive such as a compact disk (CD) drive or digital versatile disk (DVD) drive, a flash memory, etc.), communication interface (612) (e.g., Bluetooth interface, infrared interface, network interface, optical interface, etc.), input devices (610), output devices (608), and numerous other elements (not shown) and functionalities. Each of these components is described below.

In one embodiment disclosed herein, computer processor(s) (602) may be an integrated circuit for processing instructions. For example, the computer processor(s) may be one or more cores or micro-cores of a processor. Computing device (600) may also include one or more input devices (610), such as a touchscreen, keyboard, mouse, microphone, touchpad, electronic pen, or any other type of input device. Further, communication interface (612) may include an integrated circuit for connecting computing device (600) to a network (not shown) (e.g., a local area network (LAN), a wide area network (WAN) such as the Internet, mobile network, or any other type of network) and/or to another device, such as another computing device.

In one embodiment disclosed herein, computing device (600) may include one or more output devices (608), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to computer processor(s) (602), non-persistent storage (604), and persistent storage (606). Many different types of computing devices exist, and the aforementioned input and output device(s) may take other forms.

As shown above, specific embodiments have been described with reference to the accompanying figures. In the above description, numerous details are set forth as examples. It will be understood by those skilled in the art, and having the benefit of this Detailed Description, that one or more embodiments described herein may be practiced without these specific details and that numerous variations or modifications may be possible without departing from the scope of the embodiments. Certain details known to those of ordinary skill in the art may be omitted to avoid obscuring the description.

In the above description of the figures, any component described with regard to a figure, in various embodiments, may be equivalent to one or more like-named components shown and/or described with regard to any other figure. For brevity, descriptions of these components may not be repeated with regard to each figure. Thus, each and every embodiment of the components of each figure is incorporated by reference and assumed to be optionally present within every other figure having one or more like-named components. Additionally, in accordance with various embodiments described herein, any description of the components of a figure is to be interpreted as an optional embodiment, which may be implemented in addition to, in conjunction with, or in place of the embodiments described with regard to a corresponding like-named component in any other figure.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

As used herein, the phrase operatively connected, or operative connection, means that there exists between elements/components/devices a direct or indirect connection that allows the elements to interact with one another in some way. For example, the phrase 'operatively connected' may refer to any direct (e.g., wired directly between two devices or components) or indirect (e.g., wired and/or wireless connections between any number of devices or components connecting the operatively connected devices) connection. Thus, any path through which information may travel may be considered an operative connection.

While embodiments described herein have been described with respect to a limited number of embodiments, those skilled in the art, having the benefit of this Detailed Description, will appreciate that other embodiments can be devised which do not depart from the scope of embodiments as disclosed herein. Accordingly, the scope of embodiments described herein should be limited only by the attached claims.

What is claimed is:

1. A method for supporting virtual machine (VM) mobility between network devices connected to a network, the method being executed by a first network device among the network devices that is connected to a first VM executing on a first server and comprising:
   receiving, from a second network device among the network devices that is connected to a second VM executing on a second server, a route establishment request comprising an internet protocol (IP) address of the second VM, a media access control (MAC) address of the second VM, and a MAC address of the second network device;
   initiating, in response to receiving the route establishment request, programming of a connection to the second VM, wherein the programming of the connection to the second VM comprises:
     removing, from a network address table stored by the first network device, all entries matching the MAC address of the second VM; and
     programming a route to the second VM, wherein the programmed route contains the MAC address of the second network device;
   intercepting, after the programming of the connection to the second VM, a broadcast request transmitted by the first VM;
   transmitting, in response to intercepting the broadcast request, a MAC address of the first network device to the first VM;
   receiving from the first VM, in response to transmitting the MAC address of the first network device to the first VM, network traffic comprising:
     the IP address of the second VM as an IP destination address; and
     the MAC address of the first network device as a MAC destination address;
   initiating, in response to receiving the network traffic, execution of a routing lookup to:
     rewrite, based on the programmed route, the MAC destination address from the MAC address of the first network device to the MAC address of the second network device; and
     encapsulate the network traffic with a tunnel header to generate encapsulated network traffic; and
   transmitting the encapsulated network traffic to the second network device.

2. The method of claim 1, wherein
   the broadcast request is an address resolution protocol (ARP) broadcast request,
   the MAC address of the first network device is transmitted to the first VM in a proxy ARP response transmitted in response to the ARP broadcast request, and
   the route establishment request is a request for establishing a type-2 route to the second VM through the second network device.

3. The method of claim 1, further comprising:
   receiving, from the second network device, additional encapsulated network traffic;
   decapsulating the additional encapsulated network traffic to obtain decapsulated network traffic;
   determining, using the decapsulated network traffic, that a MAC destination address included in the decapsulated network traffic matches the MAC address of the first network device; and
   initiating, based on the determining, forwarding of the decapsulated network traffic to the first VM using a MAC address of the first VM as a destination address for the decapsulated network traffic.

4. The method of claim 1, further comprising:
   receiving an update from a third network device among the network devices that the first VM is connected to the third network device.

5. A method for supporting virtual machine (VM) mobility between network devices connected to a network, the method being executed by a first network device among the network devices that is connected to a first VM executing on a first server and comprising:
   receiving, from a second network device among the network devices that is connected to a second VM executing on a second server, a route establishment request that comprises a physical address of the second VM and that comprises a physical address of the second network device;
   in response to receiving the route establishment request comprising the physical address of the second VM and the physical address of the second network device, removing, from a network address table stored by the first network device, one or more entries matching the physical address of the second VM; and
   in response to receiving the route establishment request comprising the physical address of the second VM and the physical address of the second network device, programming a route to the second VM, wherein the programmed route identifies the physical address of the second network device; and transmitting, using the programmed route, network traffic from the first VM to the second network device without using the physical address of the second VM.

6. The method of claim 5, wherein the network traffic, when received from the first VM, comprises an internet protocol (IP) address of the second VM and a physical address of the first network device.

7. The method of claim 5, wherein the route establishment request comprises a request for establishing a type-2 route to the second VM through the second network device, and the programmed route to the second VM is a /32 internet protocol (IP) route or a /128 IP route.

8. The method of claim 7, wherein the route establishment request is a border gateway protocol (BGP) message comprising the type-2 route.

9. The method of claim 7, wherein the method further comprises:

receiving an update from a third network device among the network devices that the first VM is now connected to the third network device instead of the first network device; and deleting, in response to receiving the update, a physical address of the first VM from the network address table without subsequently adding the physical address of the first VM as a remote address in the network address table.

10. The method of claim 5, wherein transmitting the network traffic from the first VM to the second network device without using the physical address of the second VM comprises transmitting the network traffic by the first network device using a routing process instead of a bridging process.

11. The method of claim 10, wherein the routing process comprises a proxy address resolution protocol (ARP).

12. The method of claim 5, wherein transmitting the network traffic comprises:

intercepting a broadcast request transmitted from the first VM;

transmitting, in response to intercepting the broadcast request, a physical address of the first network device to the first VM; and receiving, in response to transmitting the physical address of the first network device to the first VM, the network traffic from the first VM, wherein the received network traffic comprises the physical address of the first network device and does not include the physical address of the second VM.

13. The method of claim 12, wherein the physical address of the first network device included in the received network traffic is set as a destination physical address of the received network traffic, and the received network traffic includes an internet protocol (IP) address of the second VM to identify the second VM as a destination target of the received network traffic.

14. The method of claim 12, wherein transmitting the received network traffic further comprises:

rewriting the physical address of the first network device in the received network traffic to the physical address of the second network device;

encapsulating the received network traffic with a tunnel header to generate encapsulated network traffic; and transmitting the encapsulated network traffic to the second network device.

15. The method of claim 5, further comprising:

receiving, from the second network device, encapsulated network traffic;

decapsulating the encapsulated network traffic to obtain decapsulated network traffic;

determining that the decapsulated network traffic includes a physical address that matches a physical address of the first network device; and initiating, based on the determining, forwarding of the decapsulated network traffic to the first VM using a physical address of the first VM.

16. A network device comprising:

storage configured to store a network address table;

one or more processors coupled to the storage and configured to:

receive, from an additional network device, a route establishment request that comprises a media access control (MAC) address of a virtual machine (VM) executing on a server connected to the additional network device and that comprises a MAC address of the additional network device;

remove, based on the received route establishment request comprising the MAC address of the VM and the MAC address of the additional network device, any entries matching the MAC address of the VM from the network address table;

program, based on the received route establishment request comprising the MAC address of the VM and the MAC address of the additional network device, a route for transmitting network traffic to the VM, wherein the programmed route includes the MAC address of the additional network device;

receive a data packet destined for the VM; and based on the programmed route, transmit, to the additional network device, the data packet destined for the VM, wherein the transmitted data packet includes the MAC address of the additional network device as a MAC destination address.

17. The network device defined in claim 16, wherein the received data packet includes an internet protocol (IP) address of the VM and a MAC address of the network device.

18. The network device defined in claim 16, wherein the route establishment request comprises a request for establishing a type-2 route to the VM through the additional network device.

19. The network device defined in claim 16, wherein the route establishment request is a border gateway protocol (BGP) message containing the MAC address of the VM and the MAC address of the additional network device.

20. The network device defined in claim 16, wherein the programmed route is a /32 internet protocol (IP) route or a /128 IP route.

* * * * *